Figure 1:
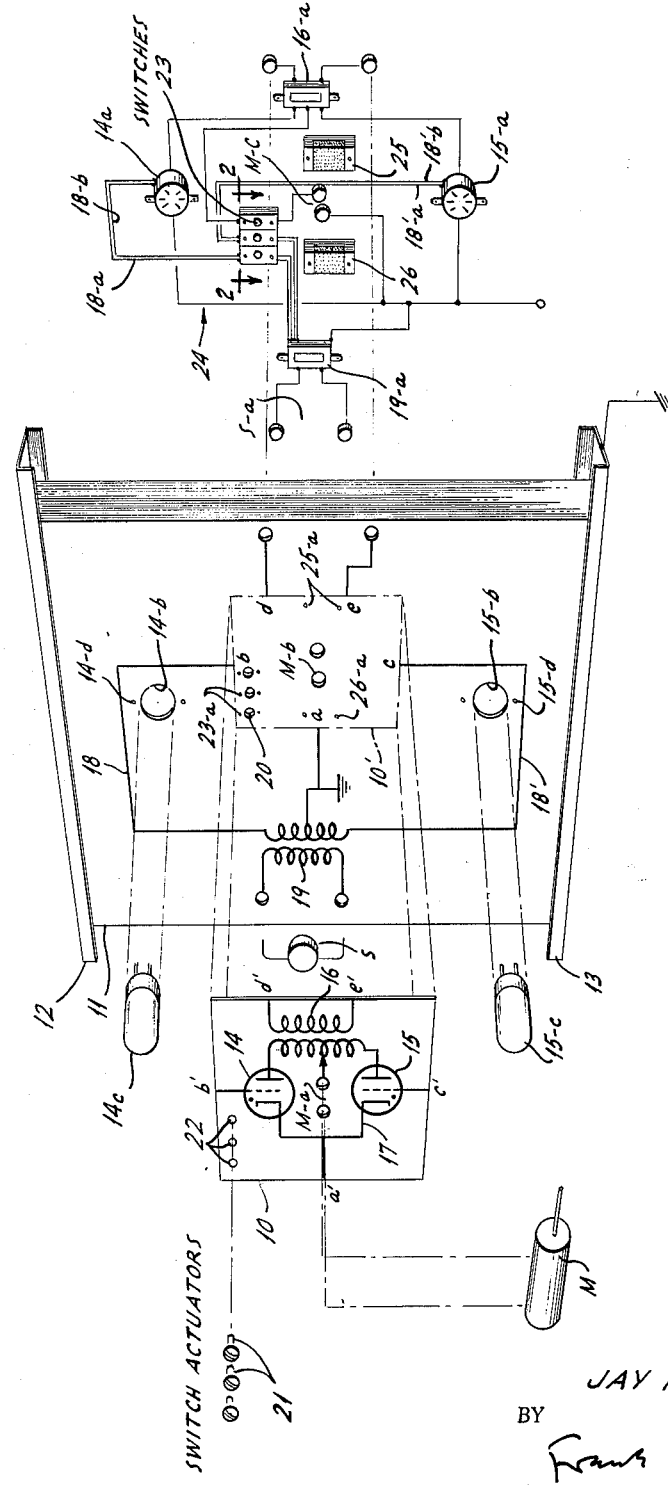

July 19, 1966

J. H. SCHLAG 3,261,112

TEACHING APPARATUS

Filed Nov. 7, 1963

2 Sheets-Sheet 1

INVENTOR.
JAY H. SCHLAG
BY
Frank D. Prager
ATTORNEY

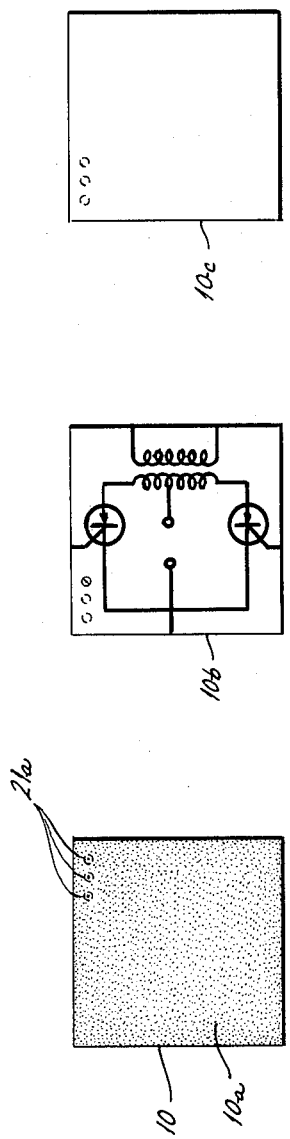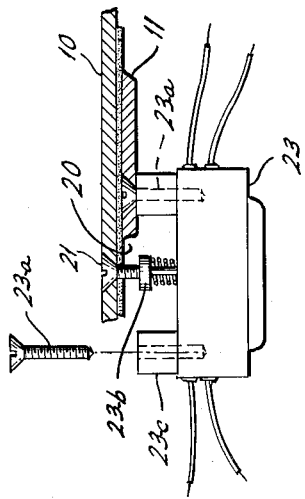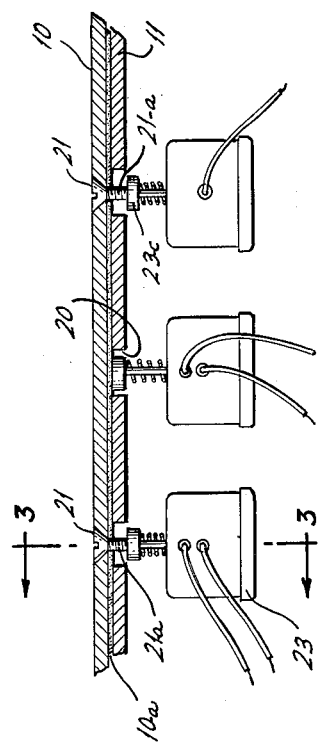

United States Patent Office 3,261,112
Patented July 19, 1966

3,261,112
TEACHING APPARATUS
Jay H. Schlag, Atlanta, Ga., assignor to Philco Corporation, Philadelphia, Pa., a corporation of Delaware
Filed Nov. 7, 1963, Ser. No. 322,126
4 Claims. (Cl. 35—19)

This invention relates to apparatus for teaching electronics and the like. Electronics involves a very large variety of components and circuits and diagrams thereof. Instructors have, heretofore, had available demonstration apparatus in which it was possible to vary diagram portions, or actual circuit portions, or both, by the use of interchangeable "overlays" applied to demonstration panels. However, the presentation often was of makeshift character, particularly so in the rather common case that a certain effect was to be produced at a point remote from a selected overlay. The instructor was forced to attempt handling the controlling overlay as well as the controlled equipment, interfering with concentration on giving the needed explanations.

Considerable improvement in the effectiveness of electronics teaching has now become available, as the present invention has made it possible more clearly, promptly, and simply to demonstrate the relationship between interchanged elements and permanent portions. Thus it is an object of the invention to provide apparatus providing for the changing of circuit and diagram overlay portions, and facilitating the simultaneous completion and explanation of every such change by corresponding control of more permanent components.

For this purpose the invention provides a new combination of overlay structures and underlying panel equipment. Each overlay, when applied to demonstrate one kind of circuit or diagram, selectively actuates certain control means on the underlying panel to produce corresponding operation of panel circuitry. In particular, the different overlay boards are provided with different combinations of switch actuator pins extending from these boards through the panel to operate different combinations of selector switches, whereby the boards produce different effects—either adjacently or remotely, and either directly or indirectly—in the operation of motor units or other controlled equipment. These novel arrangements, and the unique demonstrations allowed thereby, will be appreciated more fully upon a review of the drawing appended to this specification.

In the drawing, FIGURE 1 is an exploded perspective front view of apparatus in accordance with this invention.

FIGURE 1A is a rear view of an overlay board forming part of this apparatus, while FIGURES 1B and 1C are front views of other overlay boards for use in said apparatus. FIGURE 2 is a sectional view, taken generally along line 2—2 in FIGURE 1 and drawn on a larger scale, and FIGURE 3 is a sectional view taken generally on line 3—3 in FIGURE 2.

FIGURE 1 shows the switch actuators, characterizing this invention, in form of pins or screws 21. They are insertable in screw holes 22 of overlay board 10, but are indicated as removed therefrom. The board in turn is applicable to demonstration panel 11 as shown in broken lines at 10', but is shown as lifted off in order fully to disclose underlying structures, including panel apertures 20 and selector switches 23, to be described hereinafter.

Conventional channels 12, 13 can be used to hold the panel vertically. In order to hold board 10 on the vertical front surface of the panel, in easily removable and interchangeable condition, magnets 25, 26 are provided in back of the panel, the board being made of magnetizable material, such as steel, while the panel can be made of aluminum or electrically insulating board or some other non-magnetic material. Shown as imprinted on overlay 10 are conventional diagrammatic symbols 14, 15, 16 of electronic components, illustrated for example as thyratron tubes and transformers, and symbols 17 of interconnecting wires. Generally similar representations of wiring 18 and components 19, common to the circuits to be demonstrated, are formed on panel 11. These several markings are in registry. For instance the ends of wire symbols on the panel—here identified as end points $a, b, c, d, e$ but actually not so lettered—coincide with the ends of corresponding overlay wire symbols, said further ends being identified here by letters $a', b', c', d', e'$.

A series 20 of apertures is formed within overlay area 10' of panel 11. In registry with these apertures I insert switch actuator members 21 in overlay board 10. These actuator members are shown as small screws insertable in screw holes 22 of board 10 and which serve to extend through panel openings 20 and to actuate one or more switches 23 on the back surface of panel 11, in the way best shown in FIGURE 2 and more fully described hereinafter. Switches 23 in turn are inserted in the actual system of circuitry 24, installed at least in large part on the rear surface of panel 11 and corresponding to circuit symbols 14 to 19.

Circuit system 24, as shown in FIGURE 1, includes components 14–$a$, 15–$a$, 16–$a$, 19–$a$ corresponding to similarly numbered component symbols, provided by the combination of panel 11 and overlay 10. For instance, components 14–$a$, 15–$a$ are sockets for thyratron tubes represented at 14 and 15. These sockets are held on the back of panel 11 and are accessible from the front thereof through apertures 14–$b$, 15–$b$ respectively, for insertion of corresponding actual thyratron tubes 14–,$c$ 15–$c$. Additionally included in circuitry 24 are actual transformers 16–$a$, 19–$a$, corresponding to overlay and panel symbols 16, 19 respectively.

Inspection of the circuits and circuit symbols of FIGURE 1 will show that actual circuit components 14–$a$, 15–$a$, 19–$a$, etc. correspond in substance, but not in exact configuration or number, to their equivalents or demonstration symbols 14, 15, 19 on the panel and overlay board. For instance, a single pair of conductor symbols 18, 18', connecting the secondary coil of input transformer symbol 19 on panel 11 to the grids of thyratron tube symbols 14, 15 on overlay 10, corresponds to two pairs of actual conductors in the system used herein. One of the latter pairs comprises wires 18–$a$, 18'–$a$ and the other comprises wires 18–$b$, 18'–$b$.

These pairs of actual conductors are operated selectively under the control of switches 23 controlled by different overlays, as will be described presently. It should be noted that in an early phase of a teaching program it is desirable to concentrate on certain primary symbols and components, including for instance the various electronic tubes, and to make only these primary elements visible in front of the demonstration panel (see 14–$c$, 15–$c$). Other elements forming part of the actual circuit system, but which are educationally of secondary importance, are then secured to the rear of the panel, by fastening means generally indicated at 14–d, 15–d, etc. Similarly secured to the rear of the panel are the selector switches 23 characterizing this invention, as shown at 23–a. Additionally, the aforementioned magnet means 25, 26 are shown as attached to the rear of the panel by fasteners 25–a and 26–a, to provide for the desired releasable holding of overlay boards 10 to front surface portion 10′ of the panel.

The switch-actuating screws or pins 21, carried by overlay board 10 in accordance with the invention, have threaded bodies 21–a, inserted in overlay board 10 as shown in FIGURES 1A and 2. Their ends project rearwardly, for example through a felt or cork covering 10–a provided on the rear surface of the board in order to protect panel 11 and the markings thereon from abrasion in case of frequent applications and removals of overlay boards. Screw ends 21–a extend through panel holes 20 and into operative engagement with actuators 23–b of corresponding switches 23.

The teaching of electronics, as already mentioned, almost invariably calls for demonstration of a number of circuits and modifications thereof, by means of a basic circuit panel 11 with various circuit overlays, such as overlay 10, modified circuit overlay 10–b, etc., see FIGURE 1B. The latter is distinguished from the first mentioned overlay 10 by the combined features that it shows different circuitry symbols on its front and that it has a different pin or screw arrangement for actuation of underlying switch means 23. Both overlays 10, 10–b have room for three pins 21, side by side, corresponding to the three switches 23, but overlay 10 has pins in the first, second and third positions of this sequence, while overlay 10–b is shown with only one such pin. A variety of other combinations is available when three screw holes 22 are used.

The instructor can for instance select and use overlay 10 to demonstrate an operation of the pair of thyratron tubes 14–c, 15–c, controlling certain movements of the shaft of a motor M, in response to certain signals from a source S. By contrast, when he uses overlay 10–b, a pair of silicon rectifiers (represented on the overlay board of FIGURE 1B) must be plugged into sockets 14–a, 15–a to cause generally similar response. Thus it becomes possible to correlate overlay diagram selections intimately and promptly with demonstrations of resulting effects in actual circuit portions, at either adjacent or remote locations.

The novel correlation of switch and circuit operations with different overlay selections is achieved easily and inexpensively. Switches 23 can be mounted on the rear surface of panel 11 (FIGURE 3), for instance by screws 23–a extending through suitable spacers 23–c and threaded into the switch housings. It is only necessary to provide the panel with holes for these screws, suitably located with respect to access holes 20 and switch actuators 23–b; this can be done by using a suitable pattern of access holes 20 and holes for screws 23–a (FIGURE 1). It is equally simple to provide for the remainder of circuitry 24. For instance, signal source S has wires connected through suitable panel openings with sockets S–a forming part of panel circuitry 24, while motor M has wires connected through overlay openings M–a and panel openings M–b with similar sockets M–c.

Instead of such signal source and motor, other controlling and controlled devices can be plugged in and demonstrated by means of suitable circuits and circuit symbols; they can include for instance generators of audible or visual signals, X-ray units, oscillographs, computing systems etc. (not shown). In addition, almost endless modifications are of course possible for a typical circuit system 24 and for the corresponding diagram on the panel and overlays. Such modifications often involve for instance the use of differently dimensioned or selected components, wires, or jumpers, and differently arranged circuit portions or circuits. Use can also be made of multiple overlays (not shown), as will readily be visualized by persons skilled in the arts of constructing, using and teaching electric circuits.

For purposes of classroom work or examination it is also possible for instance to utilize blank overlays 10–c (FIGURE 1C), with front surfaces of chalk board type or the like and whereon instructors or pupils can mark desired diagram portions with chalk, crayon or pencil. Such a blank overlay can for instance have all pin positions unoccupied, thus leaving switches 23 in their normal positions. As a still further modification it is also possible in such cases to provide apertures in the overlay board, at unoccupied pin positions, thus enabling instructors and pupils manually to operate selector switches 23.

By means of the new switching feature in panel circuitry 24 (FIGURE 1), and by the corresponding switch actuator feature on overlays 10, 10–b, etc., circuit teaching becomes simpler and, at the same time, more impressive than it was heretofore. As soon as the instructor or student has registered an overlay 10 or 10–b with the corresponding area 10′ on demonstration panel 11, a pin or actuator system 21 has been indexed with switch system 23; thereby the complete physical circuit 24, including components and wiring in back of the panel and also demonstration components M, S, 14–c, 15–c etc. in front, is immediately and automatically correlated with the selected diagrammatic showing. As a result, the instructor can concentrate on significant explanations of circuit operation etc., and need no longer engage in the former laborious efforts to establish actual physical changes corresponding to the diagram changes, particularly at points remote from the overlay.

While only a single embodiment of the invention has been described, the details thereof are not to be construed as limitative of the invention. The invention contemplates such variations and modifications as come within the scope of the appended claims.

I claim:

1. Circuit teaching apparatus comprising a demonstration panel with circuit symbols disposed in front thereof; circuit means disposed in back thereof and including control means for selectively activating different ones of said circuit means; a series of overlay boards for said panel, such overlay boards having circuit symbols disposed in front thereof and matching with the circuit symbols of said panel in the selective completion of different circuit representations; and actuator means associated with such overlay boards and indexed with such control means, whereby to correlate such overlay boards with the different circuit means.

2. In electric circuit teaching apparatus: a non-magnetic demonstration panel and a series of magnetizable overlay boards adapted to cover a portion of said panel; mutually complementary circuitry markings on the front of said panel and boards; corresponding circuitry on said panel, including auxiliary switching means on the back thereof; magnet means on the back of said panel to hold at least one of said boards to the front of said panel, subject to interchange; and means incorporated in such boards for actuating said auxiliary switching means to correlate selected portions of said circuitry with such boards.

3. Circuit teaching apparatus comprising:
   a demonstration panel having front and rear surfaces and having circuit symbols on said front surface representing circuit portions common to a plurality of circuits to be demonstrated;
   a series of overlay boards each having a rear surface and a front surface, said front surface having circuit symbols representing a specific circuit portion to be demonstrated in conjunction with the circuit portions represented on said panel;
   a series of switch actuators extending from the rear surface of each overlay board, each series being individual to that board and said demonstration panel having perforations through which the switch actuators of any overlay board can extend; and switch means on the rear surface of the panel, adjacent said perforations and actuable selectively by the switch actuators of different overlay boards to energize circuit portions and thereby to effect conjoint demonstration of different specific circuits.

4. A system as described in claim 3 wherein the switch actuators of each overlay board comprise a group of pins on the rear surface of the overlay board, the overlay boards and demonstration panel also having means for plugging electrical components into said circuits through the boards and panel.

References Cited by the Examiner

UNITED STATES PATENTS

| | | | |
|---|---|---|---|
| 1,168,949 | 1/1916 | McKittrick et al. | 35—7.3 X |
| 1,902,971 | 3/1933 | Rippon | 35—35.4 X |
| 3,070,904 | 1/1963 | Saba | 35—9 |
| 3,137,079 | 6/1964 | Greuzard | 35—9 |
| 3,175,304 | 3/1965 | Och et al. | 35—19.1 |

FOREIGN PATENTS 223,402  10/1924  Great Britain.

EUGENE R. CAPOZIO, *Primary Examiner.*

HARLAND S. SKOGQUIST, *Assistant Examiner.*